(12) United States Patent
Radford (10) Patent No.: US 11,572,265 B2
(45) Date of Patent: Feb. 7, 2023

(54) PRESSURE REGULATOR VALVE

(71) Applicant: JOSEPH INTERNATIONAL COMPANY, INC., Irvine, CA (US)

(72) Inventor: Mark P. Radford, West Sussex (GB)

(73) Assignee: JOSEPH COMPANY INTERNATIONAL, INC., Irvine, CA (US)

( * ) Notice: Subject to any disclaimer, the term of this patent is extended or adjusted under 35 U.S.C. 154(b) by 225 days.

(21) Appl. No.: 16/479,485

(22) PCT Filed: Mar. 10, 2017

(86) PCT No.: PCT/IB2017/000286
§ 371 (c)(1),
(2) Date: Jul. 19, 2019

(87) PCT Pub. No.: WO2018/162939
PCT Pub. Date: Sep. 13, 2018

(65) Prior Publication Data
US 2019/0383312 A1    Dec. 19, 2019

(51) Int. Cl.
*B67C 3/26* (2006.01)
*B67D 1/04* (2006.01)
(Continued)

(52) U.S. Cl.
CPC .......... *B67D 1/0418* (2013.01); *B67C 3/2625* (2013.01); *B67C 3/28* (2013.01);
(Continued)

(58) Field of Classification Search
CPC .. B67D 1/0418; G05D 16/107; B67C 3/2625; B67C 3/28; F15B 15/204; F15B 1/265; F16K 31/502
See application file for complete search history.

(56) References Cited

U.S. PATENT DOCUMENTS

| 4,370,997 A | 2/1983 | Braithwaite |
| 4,711,377 A | 12/1987 | Brown |

(Continued)

FOREIGN PATENT DOCUMENTS

| AU | 2011 100 514 | 6/2011 |
| WO | WO 99/47451 | 9/1999 |

(Continued)

OTHER PUBLICATIONS

PCT Int'l Search Report and Written Opinion—PCT/US20/20983—dated Mar. 4, 2020—dated Aug. 4, 2020.

(Continued)

*Primary Examiner* — P. Macade Nichols
(74) *Attorney, Agent, or Firm* — Kirk O. Hahn (57) ABSTRACT

A pressure regulator valve adapted to be secured within a container housing a beverage to be dispensed through the aid of pressure within the headspace (11) above the beverage, the regulator valve includes a housing (16) containing a piston (26) having one surface exposed continuously to the pressure in the headspace and the other surface being engaged by a spring (44), a source of pressurized gas (14) such as carbon dioxide is secured to the housing and includes a valve (60) which is activated by the piston which moves responsive to a differential between the spring force and the headspace pressure to open the valve (60) when the headspace pressure falls below a predetermined level to insert the carbon dioxide into the headspace to maintain the headspace pressure sufficient to dispense the beverage.

8 Claims, 5 Drawing Sheets

(51) Int. Cl.
*B67C 3/28* (2006.01)
*F15B 1/26* (2006.01)
*F15B 15/20* (2006.01)
*F16K 31/50* (2006.01)
*G05D 16/10* (2006.01)

(52) U.S. Cl.
CPC ............ *F15B 1/265* (2013.01); *F15B 15/204* (2013.01); *F16K 31/502* (2013.01); *G05D 16/107* (2019.01)

(56) References Cited

U.S. PATENT DOCUMENTS

| | | | |
|---|---|---|---|
| 5,199,609 A | 4/1993 | Ash, Jr. | |
| 5,368,207 A | 11/1994 | Cruysberghs | |
| 5,785,211 A | 7/1998 | Tieskoetter | |
| 6,907,900 B2 | 6/2005 | Markham et al. | |
| 7,131,560 B2 | 11/2006 | Hammond | |
| 7,467,733 B2 | 12/2008 | Van't Hoff | |
| 8,251,257 B2 | 8/2012 | Oberhofer et al. | |
| 8,444,011 B2 | 5/2013 | Paauwe et al. | |
| 8,469,239 B2 | 6/2013 | Wolthers et al. | |
| 8,684,240 B2 * | 4/2014 | Sauer | B67D 1/0418 222/396 |
| 9,352,949 B2 * | 5/2016 | Rege | B67D 1/1222 |
| 10,106,394 B2 | 10/2018 | Rege et al. | |
| 2008/0203118 A1 | 8/2008 | Sauer | |
| 2009/0302069 A1 | 12/2009 | Oberhofer et al. | |
| 2011/0036414 A1 | 2/2011 | Paauwe | |
| 2015/0336785 A1 | 11/2015 | Rege et al. | |
| 2017/0113915 A1 | 4/2017 | Wothers et al. | |
| 2017/0184344 A1 | 6/2017 | Sillince | |

FOREIGN PATENT DOCUMENTS

WO  WO 2007/108684  9/2007
WO  WO 2017/218494  12/2017

OTHER PUBLICATIONS

International Search Report, PCT/IB17/000286 dated Oct. 23, 2017, 3 pgs.

* cited by examiner

PRESSURE REGULATOR VALVE

FIELD OF THE INVENTION

The present invention relates generally to an apparatus for maintaining the pressure in a container headspace at a level sufficient to dispense the beverage in the container on an automatic basis. More specifically, the present invention relates to a pressure regulator adapted for connection to a container for carbonated beverage which is automatically operated when the pressure in the headspace of the container reaches a predetermined level to insert additional pressurized gas into the container to maintain the pressure in the headspace sufficient for dispensing the beverage from the container.

BACKGROUND OF THE INVENTION

Beverages which are to be dispensed in pressurized condition from a container will be pressurized in the container with the aid of a pressurized medium such as a pressure gas. The gas will traditionally be provided in the container at a relatively high excess pressure in the same compartment in which the beverage to be dispensed is included. The pressurized gas will accumulate in the headspace above the beverage to be dispensed. At the start of the use of such a container, a high dispensing pressure will prevail but this pressure will decrease as more and more beverage is dispensed from the container. This occurs because part of the pressurized gas will leave the container together with the beverage and in addition thereto the space occupied by the pressurized gas will become increasingly greater, thus causing the pressure in that space to decrease.

To compensate for this decrease in pressure of the gas in the headspace, it is well known in the art to provide a pressure control device which does insert additional pressurized gas into the headspace as such is required. One such device is shown in WO 99/47451 which includes a movable wall within a chamber which operates a valve mechanism to temporarily open it and allow pressurized gas to flow from the chamber into the headspace.

U.S. Pat. No. 4,711,377 discloses the use of a hand-operated air pump to pressurize a beer keg with air which makes them unsuitable for use because contact with the oxygen in the air ruins the beer.

U.S. Pat. No. 5,785,211 teaches a portable electrically powered keg tapping device for use with regular beer kegs. The electrical pressure is a good replacement for a hand-pump, but it does not solve the problem of introducing air into the keg.

U.S. Pat. No. 5,199,609 teaches the use of a carbon dioxide bottle packaged in a backpack and connected by pressure tubes to a container of beer.

U.S. Pat. No. 7,131,560 discloses a lightweight beer dispensing system which utilizes a small carbon dioxide pressure bottle attached directly to an adjustable pressure regulator that can be set to avoid excess foaming and is attached directly to a keg tap having a delivery faucet.

U.S. Pat. No. 8,469,239 discloses a pressure control device for use with a beer keg which includes a piston seated within a cylinder for opening or closing a gas supply opening while a scavenger is accommodated in a pressure control chamber to scavenge carbon dioxide gas which enters that chamber.

Although there are many pressure control devices for utilization with containers for dispensing carbonated beverages such as beer or the like, they are quite complex and necessitate in many instances the utilization of a scavenger structure which adds to the cost and complexity of the device. There is thus a need for a pressure regulator valve which is automatically operable to maintain the pressure in the headspace of a container of carbonated beverage such as beer at the desired level for dispensing the beverage which is simple, effective and does not require the utilization of a scavenger.

SUMMARY OF THE INVENTION

The present invention is a pressure regulator valve adapted for connection to a container having a multi liter capacity for a carbonated beverage for automatically maintaining the pressure in the headspace above the beverage at a predetermined level to assure dispensing of the beverage and includes a housing containing a piston which is engaged by a force generating member such as a spring to urge the piston into engagement with a member movable between first and second positions to open or close a valve connected to a capsule containing a gas under pressure and is responsive to open the valve to permit the gas under pressure to enter the headspace of the container when the pressure in the headspace falls below a predetermined level.

DETAILED DESCRIPTION

The present invention is designed for utilization with any container in which a beverage is housed which beverage is to be dispensed from the container and the dispensing is to be assisted by a pressurized gas existing in the headspace above the beverage within the container. The beverage may be any type such as soft drinks, water, beer or the like and is especially designed for utilization with a carbonated beverage. The pressure regulator valve of the present invention is particularly useful in a beer keg which has a capacity of multi liters of beer and for purposes of simplicity of the description of the pressure regulator valve that will be following below, the description will be with respect to a beer keg. The pressure regulator valve of the present invention is simple in operation and includes a housing which is divided into upper and lower chambers with the lower chamber being adapted to be exposed to the pressure in the headspace of the container at all times and the upper chamber being exposed to atmosphere at all times. The regulation of the pressure is accomplished by applying a force to a piston which is housed within the housing and applies a pressure which will open or close a valve which is associated with a source of pressurized gas in such a manner as to allow the pressurized gas to flow from the source into the headspace when the pressure in the headspace falls below a predetermined level but otherwise remains closed so that no gas from the pressurized source is permitted to enter the headspace.

Figure 1:
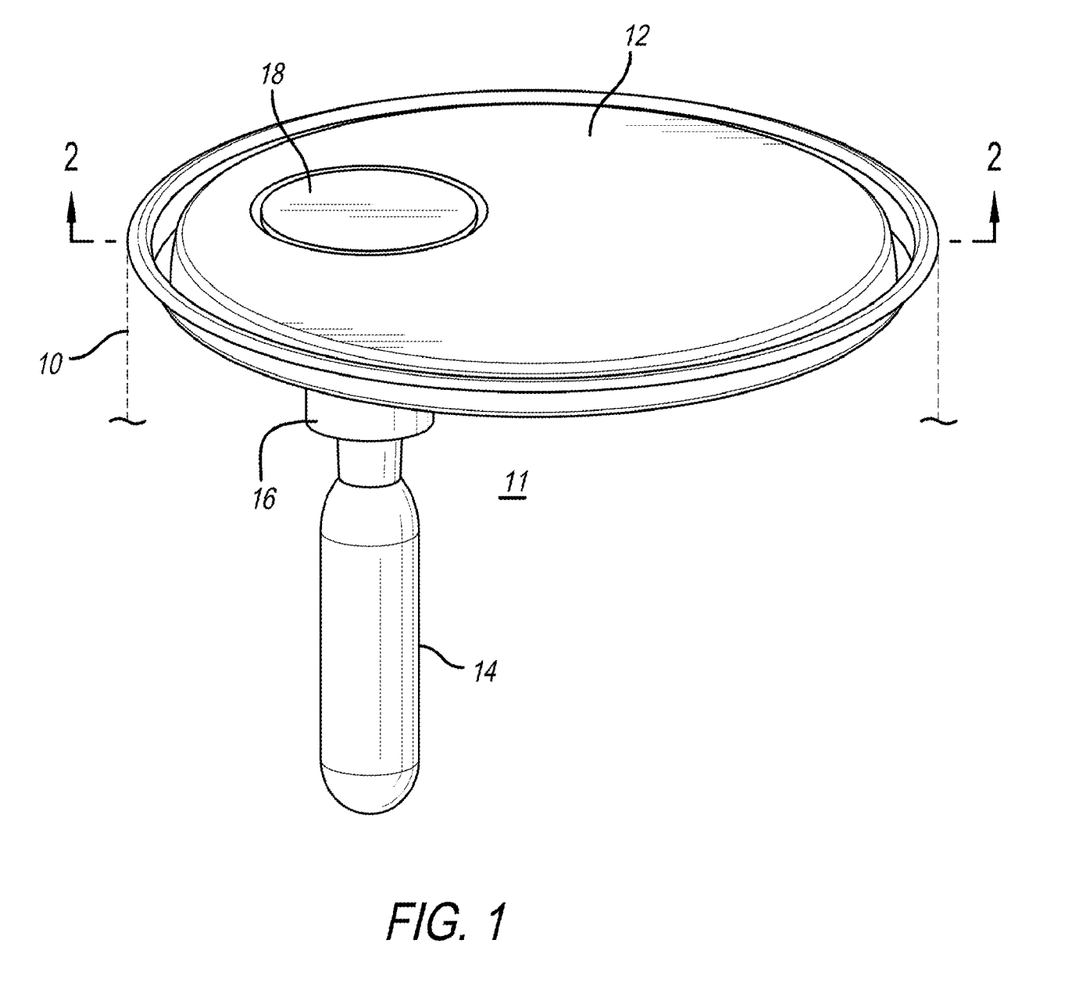
FIG. 1 is a perspective view of a lid for a container for a beverage showing the pressure regulator valve secured thereto.

Referring now more specifically to FIG. 1, a general layout of a beer keg having the pressure regulator valve of the present invention affixed thereto is illustrated. As is shown in FIG. 1, a container such as a beer keg shown at 10 by dashed lines has a lid 12 secured to the top thereof such as by crimping or other means well known to those skilled in the art. Headspace 11 exists above the beverage in the container 10. A source 14 of pressurized gas is secured to a housing 16 which contains the pressure regulator valve of the present invention. The housing 16 is secured to the lid 12 by crimping as will be described in greater detail below. As is also shown in FIG. 1, an ON/OFF valve has a switch which is in the form of a disk (18) that is rotatably secured to the pressure regulator valve within the housing 16. As will be described more fully below, when the disk 18 is rotated to the OFF position, the regulator valve contained within the housing 16 is totally inoperative and no pressurized gas from the source 14 will enter the headspace in the container. It is contemplated that when beverage is not being dispensed over a long period of time, the disk will remain in the OFF position. When the switch 18 is in the ON position, the regulation apparatus within the regulator valve is permitted to operate to allow the pressurized gas from the source 14 to flow into the headspace above the beverage within the container 10. The pressurized gas within the source 14 may be any pressurized gas which is desired, preferably it will be either an inert gas such as nitrogen or more preferably, if a carbonated beverage such as beer or a carbonated soft drink is included within the container 10, will be carbon dioxide. Additionally, the capsule may also be charged with liquid carbon dioxide. This will allow the use of a smaller capsule which will have a very low vent rate to prevent the liquid carbon dioxide from entering the beverage.

Figure 2:
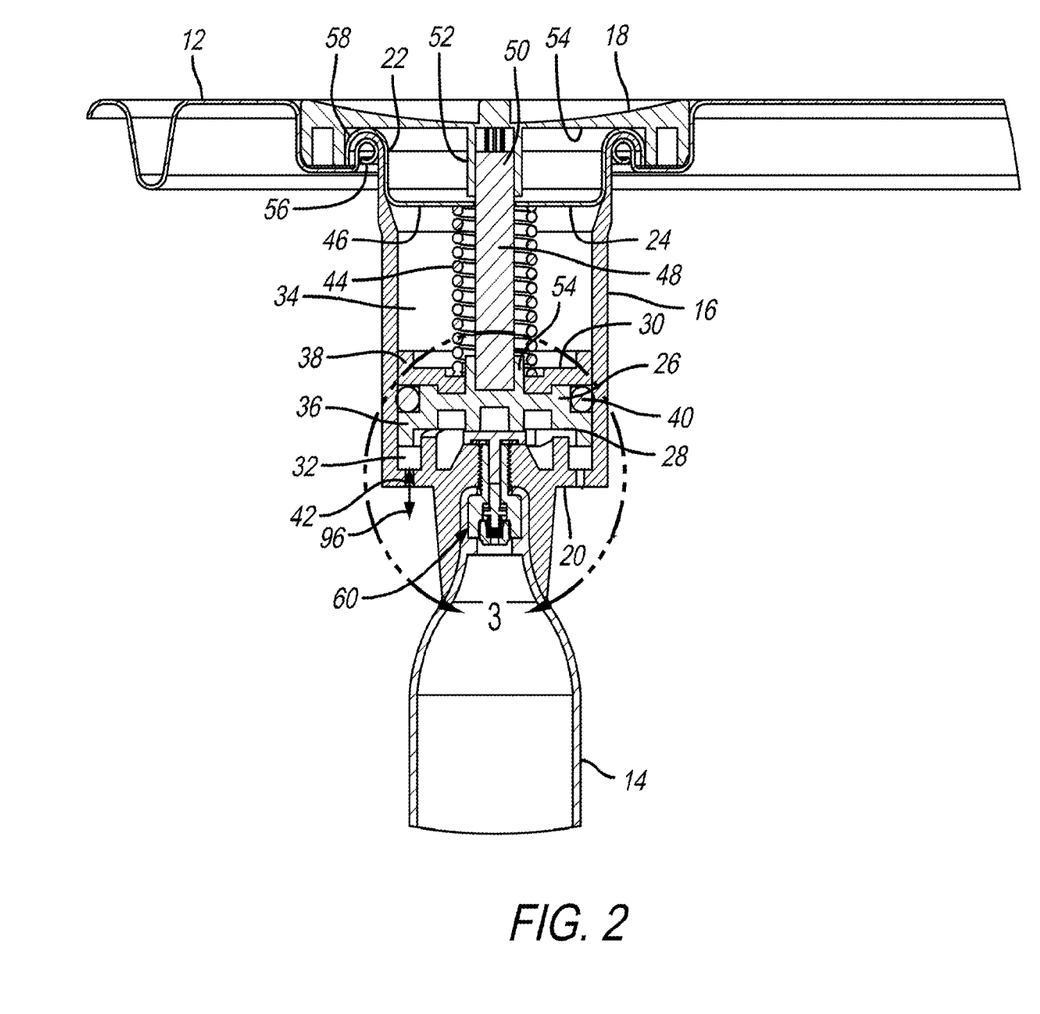
FIG. 2 is a cross-sectional view of the structure shown in FIG. 1 taken about the lines 2-2.

Referring now more specifically to FIG. 2, the pressure regulator valve of the present invention is illustrated in cross section. As is therein shown, the housing 16 includes a bottom wall 20 and a top region 22 which receives a crimp cup 24 that closes the open upper top region 22. A piston 26 having a first face 28 and a second face 30 is seated within the housing 16 and divides the housing into a first chamber 32 and a second chamber 34. As is clearly illustrated in FIG. 2, the piston 26 is formed of two separate parts 36 and 38, preferably of molded plastic. An O-ring 40 is received between the two portions 36 and 38 of the piston and functions to seal the first and second chambers from each other to prevent gas from the pressurized source 14 thereof from flowing into the second chamber 34. As a result, and since the second chamber is open to the atmosphere, any carbon dioxide that may enter the second chamber is exhausted to the atmosphere and thus there is no need for a scavenger device. The two parts 36 and 38 of the piston 26 are secured together by ultrasonic welding. The two parts 36 and 38 are utilized to make manufacture of this component easier. When two molded pieces such as illustrated in FIG. 2 are utilized, there is no need to utilize mold sliders and there is also no split line on the O-ring sealing area. However, if such is desired, it should be understood that the piston 26 may be constructed by machining a metal member which would fit within the housing 16. It should also be understood that the housing 16 in accordance with the presently preferred embodiment of the invention is a molded plastic member. However, the housing 16 may, if desired, be constructed from a metal member either by machining, molding or otherwise as would be understood by those skilled in the art. Where the housing 16 is manufactured as a molded plastic member, the interior surface of the chambers 32 and 34 may be metalized to prevent any migration of the pressurized gas through the molded parts or, alternatively, the materials from which the molded plastic parts are manufactured could be chosen to have a high barrier to the pressurized gas such as carbon dioxide. The wall 20 of the housing 16 defines a plurality of openings as illustrated at 42 so that the first surface 28 of the piston 26 is in constant communication with the pressure in the headspace 11 above the beverage in the container 10.

The regulation of the pressure regulator valve is accomplished solely through the utilization of a force generating member such as a spring 44 which is seated within the second chamber 34 with one end being in engagement with the top surface 32 of the valve 26 and the other end of the spring 44 being seated against the lower surface 46 of the crimp cup 24.

A drive shaft 48 is connected between the rotatable disk 18 and the piston 26 in such a manner that when the disk 18 is rotated, the drive shaft will rotate the piston. This is accomplished by the end 50 of the drive shaft 48 being received within a hollow tube 52 extending downwardly from the lower surface 54 of the rotatable disk 18. The connection between the upper end 52 of the drive shaft 48 and the inner surface of the hollow tube 52 is a press fit and by the friction of the press fit the drive shaft will be rotated. If desired, the interior surface of the hollow tube 52 could be formed with a plurality of grooves and the upper end of the drive shaft 50 formed by a plurality of ribs which would interface with the grooves to thereby form the desired secure connection between the rotatable disk and the drive shaft 48.

The opposite end of the drive shaft 26 would be similarly received within an upwardly extending hollow section 54 of the lower section 36 of the piston 26. The construction of the inner surface of the upwardly extending hollow section 54 and the second end of the drive shaft would be similar to that described above with regard to the connection of the upper end of the drive shaft 48 with the interior of the hollow tube 52. As a result of the press fits (or the grooves and ribs) at both ends of the drive shaft 48 and the disk 18 and piston 26, when the disk 18 is rotated, the piston will also be rotated.

The housing 16 is secured to the top 12 of the container 10 by crimping as is illustrated. The lid 12 would have an inwardly directed curl 56 which would receive the top edge of the housing 16 as it loops over the curl 56 and the crimp cup 24 would include a curl 58 which would secure both the crimp cup and the housing 16 to the lid 12. The housing 16 may be secured to the top 12 by a simple aerosol crimp as is well known in the art or by a rubber jacket which is secured to the opening in the top 12 into which the housing is pressed thus sealing any cut edges and metal exposure.

Figure 3:
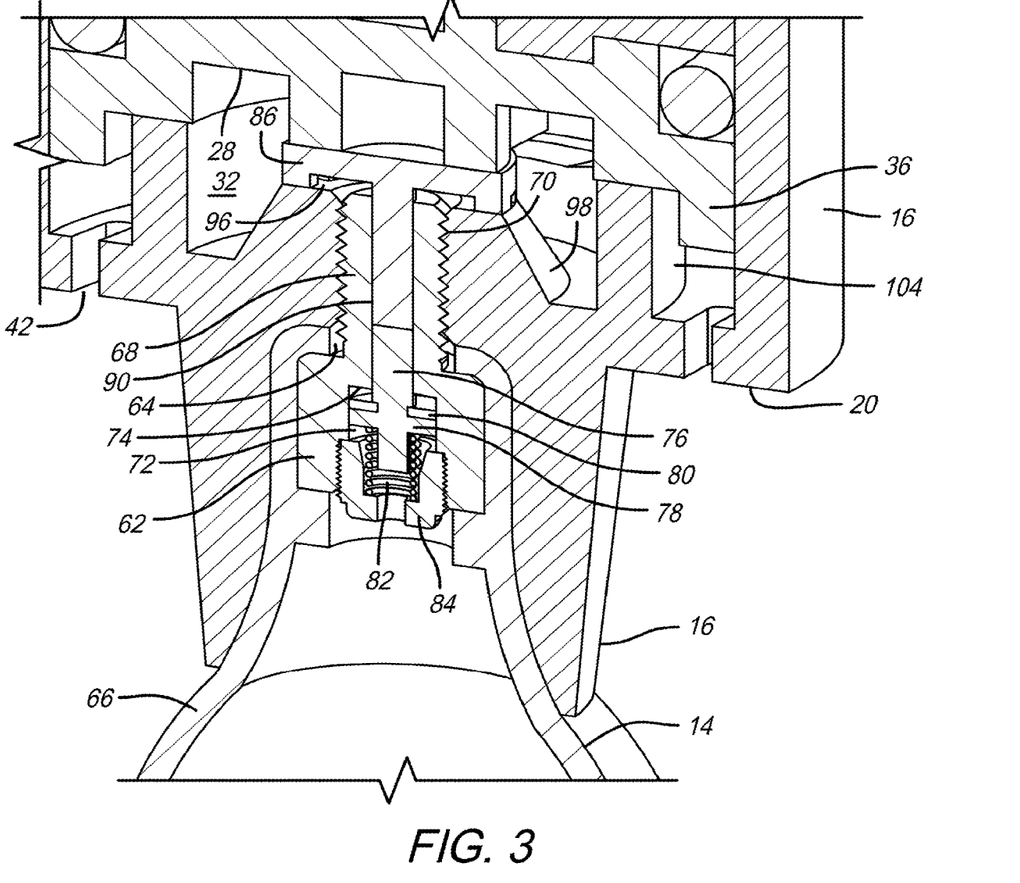
FIG. 3 is an enlarged view of the structure illustrated in FIG. 2 taken about the dashed line 3-3.

Referring now more particularly to FIG. 3, the general area as outlined by the dashed lines 3-3 in FIG. 2 is shown in an enlarged and more clarified illustration. As is therein shown, a valve means 60 includes an insert 62 which is permanently secured at the top opening 64 of the capsule 66 which forms the source 14 of the pressurized gas. The insert 62 includes a hollow threaded nipple 68 which extends upwardly above the opening 64 in the capsule 66. The housing 16 defines a threaded opening 70 therein which is utilized to threadably secure the housing 16 to the nipple 68 and thus to the capsule 66. The insert 62 defines an opening or recess 72 having a shoulder therein which defines a surface 74. The capsule valve includes a stem 76 having an outwardly extending flange 78 thereon. The top surface of the flange 78 carries a rubber sealing washer 80 which is permanently retained on the top surface of the outwardly extending flange 78. A second spring 82 is seated within a retaining bushing 84 and seats against the lower surface of the outwardly extending flange 78 to urge the stem 76 upwardly so that the rubber sealing washer 80 engages the surface 74 to seal the valve in its closed position to thereby prevent the pressurized gas within the capsule 66 from entering the chamber 32 of the housing 16 when the valve 60 is in the closed position.

Figure 4:
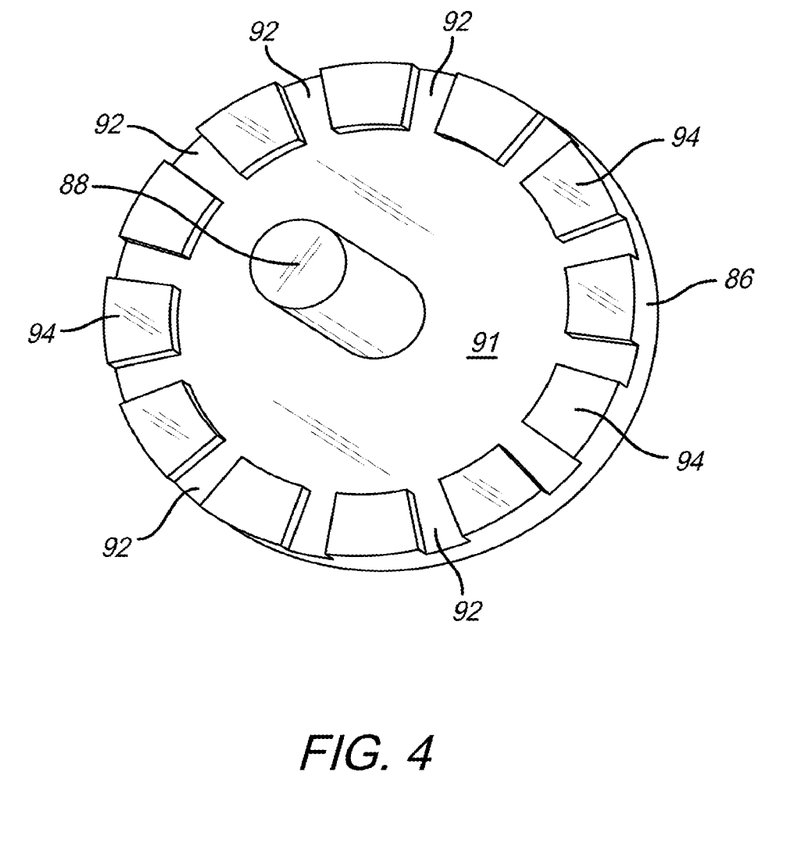
FIG. 4 is a perspective view of the capsule force pad showing the gas flow slots thereof.

A capsule force pad 86 which is better illustrated in FIG. 4 to which reference is hereby made has a downwardly extending shaft 88 which is received within an opening 90 in the upwardly extending nipple 68. The shaft 88 of the capsule force pad engages the upper end of the stem 76 of the capsule valve. The capsule force pad 86 is movable between first and second positions. When the capsule force pad is in its first position, the capsule valve 60 is in its upward position such that the rubber sealing washer 80 is in contact with the surface 74 to close the valve but when the capsule force pad is in its second position, as is illustrated in FIG. 3, the rubber sealing washer 80 is displaced from the surface 74 and the valve is open which permits the carbon dioxide or other gas within the capsule 66 to flow upwardly around the outer edge of the flange 78 and between the clearance that exists between the stem 76 and the opening 90 in the hollow nipple 68 as well as the clearance which extends between the shaft 88 and the opening 90 relative to the capsule force pad 86. The pressurized gas then strikes the bottom surface 91 of the capsule force pad and is caused to flow outwardly through the gas flow slots such as illustrated at 92 formed in a lower or downwardly, as viewed in FIG. 3, extending members as shown at 94 which engage the surface 96 on the upwardly extending pedestal 98 which extends from the bottom wall 20 of the housing 16.

Referring now more particularly to FIGS. 2, 3 and 4, the operation of the pressure regulator valve of the present invention will be described. As above indicated, as a result of the openings 42 in the bottom wall 20 of the housing 16, the first surface 28 of the piston 26 is in continuous communication with the pressure in the headspace 11 above the beverage contained within the container 10. As above indicated, that headspace initially is at an increased level which will insure that the beverage can be dispensed from the container as the consumers desire. In order for that to occur, the pressure within the head space exerts sufficient force on the piston 26 to move it upwardly from that shown in FIGS. 2 and 3 so that the spring 82 will move the capsule valve upwardly so that the sealing washer 80 seats against the surface 74 and therefore, closes the capsule valve. While in that position, no pressurized gas from the capsule 66 flows into the lower chamber 32 of the housing 16.

When the pressure within the headspace 11 drops below a predetermined level such that it would become more difficult to dispense the beer contained within the keg 10, the force exerted by the spring 44 will exceed the pressure contained within the headspace 11 and the force of the spring 44 against the second face of the piston will urge the piston downwardly so that the first face 28 of the piston will engage the capsule force pad 86 and move it downwardly so that the portions 94 on the capsule force pad will engage the surface 96 of the pedestal 98 and will, as a result, move the shaft 88 of the force pad downwardly and consequently the stem 80 of the capsule valve downwardly so that the rubber sealing washer retained on the upper surface of the flange 78 moves away from the surface 74 thus opening the valve 60. As a result, the pressurized gas such as the carbon dioxide contained within the capsule 66 will flow upwardly as above described and outwardly through the slots 92 and consequently outwardly through the openings 42 in the bottom wall 20 of the housing 16 as is illustrated by the arrow 96 in FIG. 2. When the pressure within the headspace builds up sufficiently to overcome the force generated by the spring 44, the piston will again move upwardly as above described allowing the capsule valve 60 to close and shut off the flow of the pressurized carbon dioxide.

This operation of the valve will continue as the pressure in the headspace fluctuates so that when it falls below the predetermined level or again rises above the predetermined level to cause the piston to move upwardly or downwardly and thus activate the capsule valve as above described.

Figure 5:
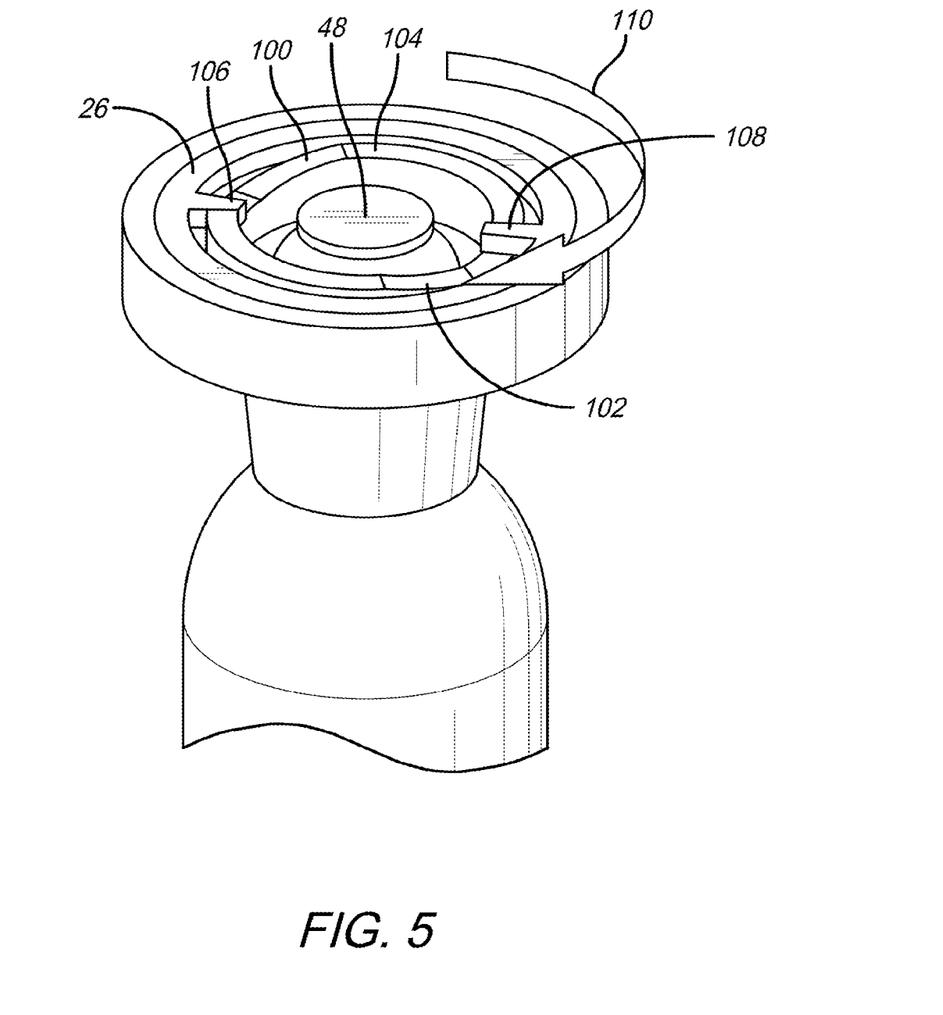
FIG. 5 is a perspective view illustrating an ON/OFF switch operation for use with the present invention.

Referring now more particularly to FIG. 5, the structure of the ON/OFF switch is illustrated. As is therein shown, a pair of inclined planes 100 and 102 are shown. These planes are found on the top surface of the rib 104 positioned within the regulator chamber 16 as shown in FIG. 3. The piston 26 has a pair of inwardly extending fingers 106 and 108 which are disposed to ride upon the inclined planes 100 and 102, respectively. When the ON/OFF switch 18 is rotated in the direction as shown by the arrow 110, the fingers 106 and 108 ride upwardly on the inclined planes 100 and 102 and through utilization of this camming function, the piston 26 is moved upwardly and, by so doing, moves into a position where it can no longer move in response to the pressure contained within the headspace 11 of the keg 10 and, therefore, is completely shut off and the system will not regulate. When the ON/OFF switch is rotated in the opposite direction from that shown by the arrow 110, the piston will be returned to a position as illustrated generally in FIGS. 2 and 3 so that the spring force at 20 mm provides a regulation pressure of approximately 1.2 bars to lift the piston automatically as above described. When in this position, it will automatically regulate the pressure contained within the keg 10 as above described.

The regulator for the pressure regulator valve as above described can be made to regulate at a range of pressures by changing the force generated by the spring and/or the diameters and/or the strokes of the piston. It should also be noted that the pressure regulator device of the present invention does not require any special equipment in the facility where the container 10 is filled with the desired beverage. It will be recognized by those skilled in the art that the container 10 may have an appropriate tap for dispensing the beverage contained within the container. Where beer is to be dispensed from the keg, the tap may be mounted at the side of the keg but preferably is at the top of the keg with an appropriate dip tube as will be recognized by those skilled in the art.

There has thus been disclosed a pressure regulator system which automatically functions to maintain the pressure within the head space above the beverage contained within an appropriate container such as a keg so that the beverage such as beer may be dispensed from the container as desired by the consumer and such is done automatically as the pressure within the headspace changes above or below a predetermined amount as determined by the force generated by the spring contained within the regulator.

What is claimed is:

1. A pressure regulator valve adapted for connection to a container having a multi-liter capacity for a carbonated beverage for automatically maintaining the pressure in the headspace (11) above the beverage at a predetermined level to assure dispensing of the beverage, including a housing (16) containing a piston (26) dividing the housing into first (32) and second (34) chambers, a capsule (66) containing a pressurized gas secured to said first chamber, valve means (60) for releasing said pressurized gas into said first chamber when the pressure within said headspace falls below said predetermined level, said second chamber is open to the atmosphere;
said piston (26) includes first (28) and second (30) faces;
said first face being in constant communication with the pressure in said headspace;
said capsule (16) being secured to said housing at a position adjacent said first chamber;
a force generating member (44) seated within said second chamber urging said piston (26) toward said capsule;
a capsule force pad (86) movable between first and second positions, when in said first position the capsule valve means is closed and when in said second position the capsule valve means is open and said gas under pressure is directed through said first chamber of said housing into said headspace; and
said first face of said piston (26) engaging said capsule force pad (86) responsive to said force generating member urging said piston (26) toward said capsule (66) when the pressure in said headspace falls below said predetermined level to move said capsule force pad to said second position to open said capsule valve means, and
which further includes an ON/OFF switch including an inclined plane (100-102) within said housing (16), a portion of said first face (28) of said piston (26) engaging said inclined plane (100-102), means (18,48) for rotating said piston to move it on said inclined plane (100-102) against the force of said force generating member to a position where it is no longer responsive to the pressure within said headspace.

2. The pressure regulator valve as defined in claim 1 wherein said means for rotating said piston includes a disk (18) rotatably secured to said housing and a drive shaft (48) secured to said disk and said piston.

3. The pressure regulator valve as defined in claim 2 wherein said drive shaft is secured to said disk by a press fit and to said piston by a press fit.

4. The pressure regulator valve as defined in claim 1 wherein said housing includes a bottom wall, a rib (104) extending upwardly from said bottom wall and having an upper surface thereof slanted to form said inclined plane, said piston includes inwardly extending fingers (106,108) riding on said inclined plane.

5. A pressure regulator valve adapted for connection to a container having a multi-liter capacity for a carbonated beverage for automatically maintaining the pressure in the headspace (11) above the beverage at a predetermined level to assure dispensing of the beverage, including a housing (16) containing a piston (26) dividing the housing into first (32) and second (34) chambers, a capsule (66) containing a pressurized gas secured to said first chamber, valve means (60) for releasing said pressurized gas into said first chamber when the pressure within said headspace falls below said predetermined level, said second chamber is open to the atmosphere;
said piston (26) includes first (28) and second (30) faces;
said first face being in constant communication with the pressure in said headspace;
said capsule (16) being secured to said housing at a position adjacent said first chamber;
a force generating member (44) seated within said second chamber urging said piston (26) toward said capsule;
a capsule force pad (86) movable between first and second positions, when in said first position the capsule valve means is closed and when in said second position the capsule valve means is open and said gas under pressure is directed through said first chamber of said housing into said headspace; and
said first face of said piston (26) engaging said capsule force pad (86) responsive to said force generating member urging said piston (26) toward said capsule (66) when the pressure in said headspace falls below said predetermined level to move said capsule force pad to said second position to open said capsule valve means, and
wherein said capsule valve means includes a stem (76) having an outwardly extending flange (78), a sealing washer (80) retained on said flange for engaging a surface to close said capsule valve means when said capsule force pad is in said first position.

6. The pressure regulator valve as defined in claim 5 which further includes an insert (62) secured to an opening in the top of said capsule and having a hollow threaded nipple (68) extending upwardly from said capsule, said housing being threadably secured to said threaded nipple, said insert defining a recess within which said capsule valve means member is sealed, said recess defining a shoulder providing said surface against which said sealing washer seats.

7. A pressure regulator valve adapted for connection to a container having a multi-liter capacity for a carbonated beverage for automatically maintaining the pressure in the headspace (11) above the beverage at a predetermined level to assure dispensing of the beverage, including a housing (16) containing a piston (26) dividing the housing into first (32) and second (34) chambers, a capsule (66) containing a pressurized gas secured to said first chamber, valve means (60) for releasing said pressurized gas into said first chamber when the pressure within said headspace falls below said predetermined level, said second chamber is open to the atmosphere;
said piston (26) includes first (28) and second (30) faces;
said first face being in constant communication with the pressure in said headspace;
said capsule (16) being secured to said housing at a position adjacent said first chamber;
a force generating member (44) seated within said second chamber urging said piston (26) toward said capsule;
a capsule force pad (86) movable between first and second positions, when in said first position the capsule valve means is closed and when in said second position the capsule valve means is open and said gas under pressure is directed through said first chamber of said housing into said headspace; and
said first face of said piston (26) engaging said capsule force pad (86) responsive to said force generating member urging said piston (26) toward said capsule (66) when the pressure in said headspace falls below said predetermined level to move said capsule force pad to said second position to open said capsule valve means, and
which further includes a crimp cup (24) secured to said housing for securing said pressure regulator valve to said container and said force generating means in a first spring seated in said second chamber between said crimp cup and said second face of said piston.

8. The pressure regulator valve as defined in claim 7 wherein said capsule force pad defines a plurality of slots (92) through which said pressurized gas flows into said first chamber.

* * * * *